(12) United States Patent
Goel et al.

(10) Patent No.: US 7,840,684 B2
(45) Date of Patent: Nov. 23, 2010

(54) METHODS AND APPARATUS FOR MANAGING A PLURALITY OF HOME PAGES FOR A USER

(75) Inventors: Amit Goel, New Delhi (IN); Marion E Kaposztas, Hillsborough, NJ (US); Michael J. Krack, Los Altos, CA (US); Ronald S. Rozensky, Bradenton, FL (US); Ernest Lee Shero, McKinney, TX (US)

(73) Assignee: Avaya Inc., Basking Ridge, NJ (US)

( * ) Notice: Subject to any disclaimer, the term of this patent is extended or adjusted under 35 U.S.C. 154(b) by 854 days.

(21) Appl. No.: 11/526,195

(22) Filed: Sep. 22, 2006

(65) Prior Publication Data
US 2008/0077678 A1 Mar. 27, 2008

(51) Int. Cl.
*G06F 15/16* (2006.01)
(52) U.S. Cl. ...................................... 709/227
(58) Field of Classification Search ................. 709/227, 709/228
See application file for complete search history.

(56) References Cited

U.S. PATENT DOCUMENTS 6,718,535 B1 * 4/2004 Underwood ................ 717/101
7,054,900 B1 * 5/2006 Goldston .................... 709/203
7,103,642 B1 * 9/2006 Chen et al. .................. 709/218

OTHER PUBLICATIONS

Dmitry Skorniakov, Monitor Internet Sites Automatically with Check&Get, Aug. 12, 2004, Press Release, Whole Document.*
Dmitry Skorniakov, the Smartest Bookmark Manager just got smarter . . . , Jun. 1, 2004, Press Release, Whole Document.*
ActiveURLs, Homepage, 1999-2008, updated website.*
"Google Browser Sync for Firefox," Downloaded on Sep. 18, 2006, http://www.google.com/tools/firefox/browsersync.
"FireFox Session Saver," Downloaded on Sep. 18, 2006, http://addons.mozilla.org/firefox/436/.
"Check & Get," Downloaded on Sep. 18, 2006, http://activeurls.com/en/.

* cited by examiner

*Primary Examiner*—Wing F Chan
*Assistant Examiner*—Andrew Woo
(74) *Attorney, Agent, or Firm*—Joseph B. Ryan; Jason Paul DeMont; Wayne S. Breyer

(57) ABSTRACT

Methods and apparatus are provided for managing a plurality of home pages for a user. One or more web pages are presented to a user by identifying a plurality of home pages associated with the user; and selecting one or more of the home pages to present to the user based on one or more predefined rules. The home pages associated with the user can be selected by the user. A number of different predefined rules can be applied for selecting the home pages to be presented to the user.

18 Claims, 4 Drawing Sheets

FIG. 3

URL POOL TABLE - 300

| HOME PAGE(S) | URL | WEIGHT | SCHEDULE | START ORDER |
|---|---|---|---|---|
| ENTERPRISE PORTAL | enterpriseportal.avaya.com | 30 | | |
| EMPLOYEE DIRECTORY | www.post.avaya.com | 10 | EVERY DAY | 1 |
| EXCHANGE WEB MAIL | webmail.avaya.com | 50 | | |
| SUN JAVA | java.sun.com | 20 | | |
| SABLIME | drsablime6.avaya.com | 15 | | |
| JAVA NET | www.java.net | 25 | EVERY DAY | 2 |
| EQM WIKI | eqm.dr.avaya.com/eqmwiki | 90 | | |
| SSDP | ssdp.dr.avaya.com | 17 | | |
| SourceForge | www.sourceforge.net | 19 | | |
| eBay | search.ebay.com | 11 | | |
| DELL SUPPORT | support.dell.com | 13 | | |
| EARTHLINK MAIL | webmail.earthlink.net | 21 | | |
| JAVA | www.java.com | 27 | | |
| JavaWorld | www.javaworld.com | 29 | | |
| JavaBoutique | www.javaboutique.com | 31 | | |
| JavaRanch | www.javaranch.com | 35 | | |
| EXPENSE MANAGEMENT SYSTEM | Xms.avaya.com | | SECOND TUESDAY EVERY MONTH | |

310  320  330  340  350

FIG. 4
HOME PAGE SELECTION RULE BASE – 400

| RULE NAME | RULE SELECTION CRITERIA |
|---|---|
| RANDOM HOME PAGES | SELECT HOME PAGE RANDOMLY FROM URL POOL TABLE 300 |
| SCHEDULED HOME PAGES | SELECT HOME PAGE FROM URL POOL TABLE 300 BASED ON PREDEFINED SCHEDULE (USER SPECIFIED OR LEARNED) |
| CHANGED HOME PAGES | SELECT HOME PAGE FROM URL POOL TABLE 300 BASED ON PERCENTAGE CHANGED ON EACH PAGE |
| CONFIGURABLE SELECTION OF HOME PAGES | SELECT HOME PAGE FROM URL POOL TABLE 300 BASED ON PRESENCE OF CONFIGURABLE ITEM |
| MULTIPLE HOME PAGES | SELECT CONFIGURABLE NUMBER OF HOME PAGES FROM URL POOL TABLE 300 |
| WEIGHTED HOME PAGES | SELECT HOME PAGE FROM URL POOL TABLE 300 BASED ON ASSIGNED WEIGHTS |
| ... | ... |

METHODS AND APPARATUS FOR MANAGING A PLURALITY OF HOME PAGES FOR A USER

FIELD OF THE INVENTION

The present invention relates generally to techniques for accessing information over the Internet, and more particularly, to techniques for managing a plurality of home pages for a user.

BACKGROUND OF THE INVENTION

The Internet (World Wide Web) is a valuable resource that provides vast amounts of information to users. Web browsers, such as Microsoft Internet Explorer, are applications that allow users to access information over the Internet. Most web browsers allow a user to specify a home page that is the web site or local file that is automatically loaded when a web browser starts. Typically, a user will specify the web site that is of greatest interest as his or her home page. In this manner, each time the browser is initiated by the user, the user will automatically see the specified home page.

For web sites that are frequently visited by a user, the user will typically be most interested in the portions of a web page that have changed since a prior visit. Thus, a number of techniques exist for determining when previously visited pages have changed. For example, the "Check and Get" web monitoring system (http://activeurls.com/en) can monitor specified web sites for changes and updates, and present the changed contents to a user. Generally, the user is notified of the changes by an email. Really Simple Syndication, also known as Rich Site Summary or RDF Site Summary (RSS), is another method that users can employ to track and manage changes to websites. A user subscribes to the RSS feed of a site. When a change is detected, the browser indicates the update to the user. The user is presented with a list of articles, posts, and responses from the site.

While such tools have greatly improved the ability of users to easily and efficiently access information over the Internet, a number of limitations exist, which if overcome, could further improve the efficiency and utility of web browsers. For example, an email notification of changes to a web page tends to be ineffective, given the number of new emails per day for a typical user. In addition, user action is still required to actually view any changed pages. Likewise, the ability to define only a single home page is often insufficient for most users. In addition, subscribing to RSS feeds also has limitations. The user must manually view the change listed in the feed; depending on the RSS reader used, the user may manually set the update as Read or Delete.

A need therefore exists for improved techniques for accessing information over the Internet. A further need exists for methods and apparatus for managing a plurality of home pages for a user.

SUMMARY OF THE INVENTION

Generally, methods and apparatus are provided for managing a plurality of home pages for a user. According to one aspect of the invention, one or more web pages are presented to a user by identifying a plurality of home pages associated with the user; and selecting one or more of the home pages to present to the user based on one or more predefined rules. The home pages associated with the user can be selected by the user.

A number of different predefined rules can be applied for selecting the home pages to be presented to the user. For example, predefined rules can be established to select one or more web pages randomly or based on a predefined schedule. In addition, a rule can selects one or more web pages based on a percentage change of each of the plurality of home pages, a presence of one or more predefined content items in the home pages or a weighting assigned to each of the plurality of home pages.

A more complete understanding of the present invention, as well as further features and advantages of the present invention, will be obtained by reference to the following detailed description and drawings.

BRIEF DESCRIPTION OF THE DRAWINGS

FIG. 3 is a sample table from an exemplary URL pool table for a given user or group of users;

FIG. 4 is a sample table from an exemplary home page selection rule base; and

DETAILED DESCRIPTION

The present invention provides methods and apparatus for managing a plurality of home pages for a user. According to one aspect of the invention, a user can define a plurality of home pages and one or more of the home pages can be selected for presentation to the user based on one or more predefined rules. The rules can be based on, for example, a random selection, a predefined schedule, or a percentage change of each of the plurality of home pages.

Figure 1:
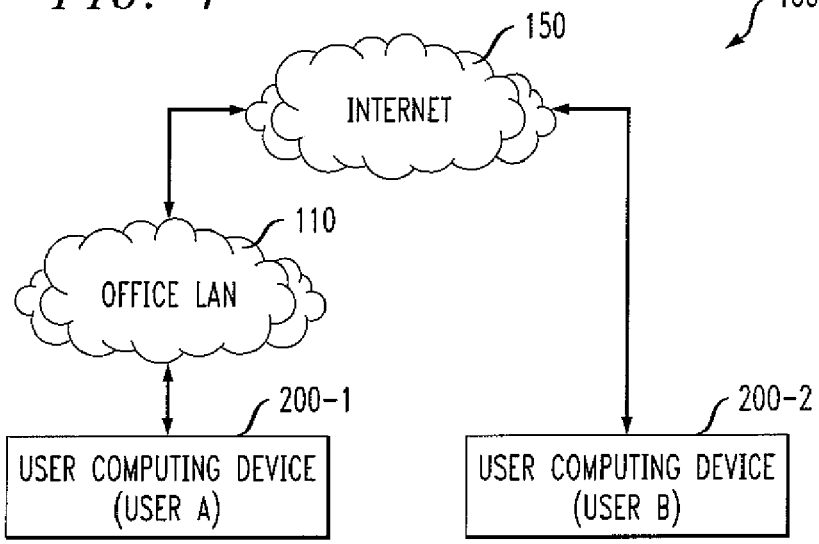
FIG. 1 illustrates an exemplary network environment in which the present invention can operate.

FIG. 1 illustrates an exemplary network environment 100 in which the present invention can operate. As shown in FIG. 1, one or more user computing devices 200, discussed further below in conjunction with FIG. 2, such as user computing devices 200-1 and 200-2, are connected to one or more networks, such as the Internet 150. In the exemplary embodiment shown in FIG. 1, the computing device 200-1 is connected to the Internet 150 via a Local Area Network (LAN) 110, associated with, for example, an office. The computing device 200-2 may be connected to the Internet 150, for example, via an Internet Service Provider (not shown).

According to one aspect of the invention, a user can have a plurality of predefined home pages. A number of techniques are disclosed for selecting one or more of the plurality of predefined home pages to present to the user upon starting a browser application, such as Microsoft Internet Explorer or Firefox. As used herein, the term "home page(s)" are the Uniform Resource Locators (URLs) or local files that are automatically loaded when a web browser starts.

Figure 2:
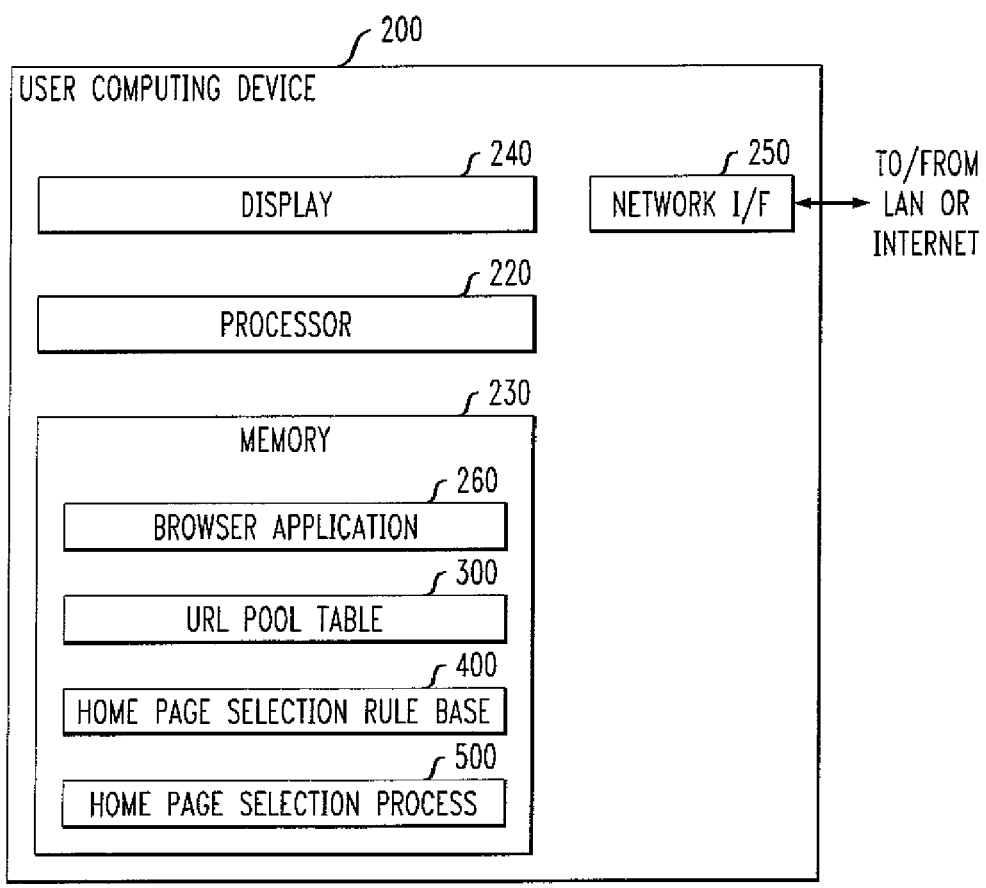
FIG. 2 is a block diagram of an exemplary computing device that can implement the processes of the present invention.

FIG. 2 is a block diagram of an exemplary computing device 200 that can implement the processes of the present invention. The computing device 200 may be embodied as any computing device that can be connected to a network, including, for example, notebook computers, laptops, handheld computers, palmtops, personal digital assistants (PDAs), and desktop computers.

As shown in FIG. 2, a memory 230 configures the processor 220 to implement the home page management methods, steps, and functions disclosed herein. For example, as shown in FIG. 2, the memory 230 stores a browser application 260, which may be implemented as a conventional browser, as modified herein to provide the features and functions of the present invention. In addition, as discussed further below in conjunction with FIGS. 3 through 5, respectively, the exemplary memory 230 stores a URL pool table 300, a home page selection rule base 400 and a home page selection process 500.

The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of system 200 can be incorporated into an application-specific or general-use integrated circuit. The computing device 200 optionally includes a display 240.

The computing device 200 also includes one or more network interfaces 250. For example, the computing device 200 can include one or more of a LAN network interface, a WiFi network interface and an Evolution Data Only (EvDO) network interface 250-N (optimized version of CDMA 2000). The wireless network interfaces typically have associated antennas (not shown) for wireless communication with a remote antenna.

FIG. 3 is a sample table from an exemplary URL pool table 300 for a given user or group of users. Generally, the URL pool table 300 allows a user to record a plurality of home pages, and corresponding selection criteria for selecting one or more of the home pages to present to the user when the browser is initiated (or when the user otherwise indicates that the home page(s) should be presented, for example, by clicking on a button).

The URL pool table 300 includes a plurality of records, each associated with a different home page. For each home page identified in field 310, the exemplary URL pool table 300 indicates the corresponding URL in field 320. In addition, the exemplary URL pool table 300 includes one or more different fields 330, 340, 350 that support separate criteria for selecting one or more home pages for presentation to a user.

A number of different home page selection criteria are discussed further below in conjunction with FIG. 4. As shown in FIG. 3, the exemplary URL pool table 300 includes a field 330 for recording a weight associated with each home page, a field 340 for recording a schedule for the various home pages, and a field 350 for recording a starting order for the various home pages.

FIG. 4 is a sample table from an exemplary home page selection rule base 400. Generally, the home page selection rule base 400 records a number of different home page selection criteria. As shown in FIG. 4, the home page selection rule base 400 includes a plurality of home page selection rules. For each rule identified in field 420, the home page selection rule base 400 records corresponding selection criteria associated with the rule in field 430.

For example, the exemplary home page selection rule base 400 includes a random home pages rule in record 402 that selects one or more home page randomly from the URL pool table 300. In addition, a scheduled home pages rule in record 404 selects one or more home pages from the URL pool table 300 based on the predefined schedule in field 340 of the URL pool table 300 (the schedule can be specified by the user or automatically learned from user behavior). For example, if a user work with a given web page on a regular basis, such as the first Thursday of every month, the browser may be configured such that the web page is presented to the user based on the schedule. In addition, the user can specify a schedule that is recorded in field 340 of the URL pool table 300.

A changed home pages rule in record 406 selects one or more home pages from the URL pool table 300 based on the percentage that each page has changed. Any known techniques for quantifying the degree of change can be employed. For example, in one exemplary implementation, changes to the text of a web page can be detected and quantified, while changes to HTML tags would not constitute a changed event. In addition, changes to the size of images can be detected (e.g., changes in dimension or file size). For example, if there are five web pages specified in the URL pool table 300 and one page has changed 90% and the other four pages have changes less than 90%, the page that changed 90% will be displayed first, then the rest in order based on the amount changed.

A configurable selection of home pages rule in field 408 selects one or more home page from the URL pool table 300 based on the presence of one or more configurable items in a given web page. For example, the configurable item could be the presence of a voice mail message. In this manner, if the browser is started when there is a voice mail message waiting for the user, the browser automatically goes to the web page that manages the user's voice mail.

A multiple home pages rule in record 410 selects a configurable number of home pages from the URL pool table 300. In one exemplary implementation, the configurable number of home pages can be presented to the user in accordance with a specified start order, shown in field 350 of the URL pool table 300. For example, when a user logs in to his or her computer, five browsers are started each on a different predefined web page from the URL pool table 300.

Finally, an exemplary weighted home pages rule in record 412 selects one or more home page from the URL pool table 300 based on the assigned weights recorded in field 330 of the URL pool table 300. For example, if the content of one URL (with assigned weighting of 0.2) has changed and the content of another URL (with weighting of 0.7) has changed, the second, higher weighted URL will be displayed.

In further variations, the user can configure a static "home" URL such that when the user clicks on the home page button the static URL is displayed. The button may be configured such that the "home" page may be whatever URL is the highest priority in the pool 300 based on above possible configurations. In addition, "push" techniques can be employed by an entity, such as an employer to "push" a weighted URL to the browser such that the next time a user opens a browser it will be at the URL the entity requires. For example, if an employer wants employees to take a class which the user has not yet taken, the browser will automatically open to a web page associated with the required class for the user.

Figure 5:
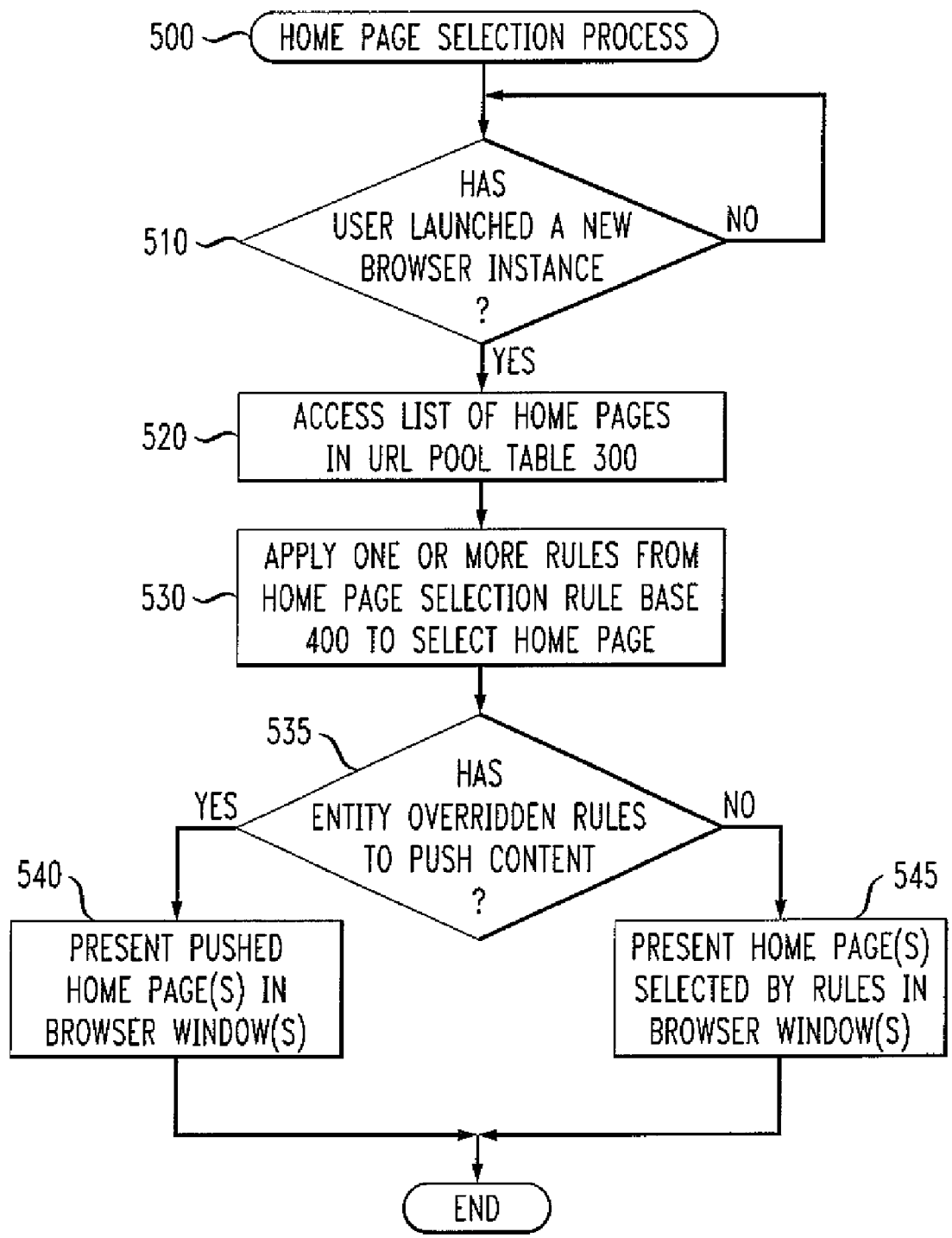
FIG. 5 is a flow chart describing an exemplary home page selection process incorporating features of the present invention.

FIG. 5 is a flow chart describing an exemplary home page selection process 500 incorporating features of the present invention. Generally, the home page selection process 500 employs the exemplary rules in the home page selection rule base 400 to select one or more predefined home pages from the URL pool table 300 to present to the user.

A test is initially performed during step 510 to determine if the user has launched a new browser instance (or otherwise indicated that the home page(s) should be presented, for example, by clicking on a browser button). The new browser instance may be a newly executed browser instance, or may be a tab within an existing browser. Once the user has launched a new browser instance, the home page selection process 500 accesses the list of predefined home pages in the URL pool table 300 during step 520.

Thereafter, one or more rules from the home page selection rule base 400 (FIG. 4) are applied to select one or more home pages to present to the user during step 530. A test is then performed during step 535 to determine if the entity (such as an enterprise or employer) has overridden the rules. If it is determined during step 535 that an entity has overridden the rules, then one or more web pages are pushed to the user's browser during step 540. If, however, it is determined during step 535 that an entity has not overridden the rules, then the home page(s) selected by the rules are then presented to the user in one or more corresponding browser window(s) during step 545.

While FIG. 5 shows an exemplary sequence of steps, it is also an embodiment of the present invention that the sequence may be varied. Various permutations of the algorithm are contemplated as alternate embodiments of the invention.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   receiving by a computing device, at least one signal that identifies a plurality of web pages associated with a user, wherein the plurality of web pages are selected by the user;
   selecting by the computing device a home page from the plurality of web pages to present to the user based on a predefined rule; and
   presenting the home page by the computing device to the user;
   wherein the predefined rule is based, at least in part, on a schedule that is deduced from the access of the user over time to, and only to, the plurality of web pages.

2. The method of claim 1, wherein the predefined rule is also based on a percentage change of each of the plurality of web pages.

3. The method of claim 1, wherein the predefined rule is also based on a presence of a predefined content item in the plurality of web pages.

4. The method of claim 1, wherein the predefined rule is also based on a configurable number of the plurality of web pages for presentation to the user.

5. The method of claim 1, wherein the predefined rule is also based on a weighting assigned to each of the plurality of web pages.

6. The method of claim 1, wherein an entity may override the predefined rule and "push" a home page to a browser.

7. A system comprising:
   a memory; and
   a processor, coupled to the memory, operative to:
   receiving at least one signal that identifies a plurality of web pages associated with a user, wherein the plurality of web pages is identified by the user;
   selecting a home page from the plurality of web pages to present to the user based on a predefined rule; and
   presenting the home page to the user;
   wherein the predefined rule is based, at least in part, on a schedule that is deduced from the access of the user over time to, and only to, the plurality of web pages.

8. The system of claim 7, wherein the predefined rule is also based on a percentage change of each of the plurality of web pages.

9. The system of claim 7, wherein the predefined rule is also based on a presence of a predefined content item in the plurality of web pages.

10. The system of claim 7, wherein the predefined rule is also based on a configurable number of the plurality of web pages for presentation to the user.

11. The system of claim 7, wherein the predefined rule is also based on a weighting assigned to each of the plurality of web pages.

12. A method comprising:
    receiving by a computing device, at least one signal that identifies a plurality of web pages associated with a user, wherein the plurality of web pages are selected by the user;
    selecting by the computing device a home page from the plurality of web pages to present to the user based on a predefined rule; and
    presenting the home page by the computing device to the user;
    wherein the predefined rule is based, at least in part, on a predefined schedule of access of the user to, and only to, the plurality of web pages.

13. The method of claim 12, wherein the predefined schedule is specified by the user.

14. The method of claim 12, wherein the predefined rule is also based on a percentage change of each of the plurality of web pages.

15. The method of claim 12, wherein the predefined rule is also based on a presence of a predefined content item in the plurality of web pages.

16. The method of claim 12, wherein the predefined rule is also based on a configurable number of the plurality of web pages for presentation to the user.

17. The method of claim 12, wherein the predefined rule is also based on a weighting assigned to each of the plurality of web pages.

18. The method of claim 12, wherein an entity may override the predefined rule and "push" a home page to a browser.

\* \* \* \* \*